(12) United States Patent
Kawaguchi et al.

(10) Patent No.: US 8,391,694 B2
(45) Date of Patent: Mar. 5, 2013

(54) DISPLAY APPARATUS

(75) Inventors: Yoshitaka Kawaguchi, Kanagawa (JP);
Masakazu Hama, Kanagawa (JP);
Toshiyuki Kirino, Kanagawa (JP);
Hirohide Okahara, Kanagawa (JP)

(73) Assignee: Panasonic Corporation, Osaka (JP)

( * ) Notice: Subject to any disclaimer, the term of this patent is extended or adjusted under 35 U.S.C. 154(b) by 1827 days.

(21) Appl. No.: 11/571,634

(22) PCT Filed: Jun. 22, 2005

(86) PCT No.: PCT/JP2005/011463
§ 371 (c)(1),
(2), (4) Date: Jan. 4, 2007

(87) PCT Pub. No.: WO2006/003825
PCT Pub. Date: Jan. 12, 2006

(65) Prior Publication Data
US 2008/0044163 A1 Feb. 21, 2008

(30) Foreign Application Priority Data

Jul. 6, 2004 (JP) ................................. 2004-199113

(51) Int. Cl.
*H04N 5/77* (2006.01)
(52) U.S. Cl. .................... 386/358; 386/361; 386/362
(58) Field of Classification Search .................. 386/117, 386/118, 358, 361, 362
See application file for complete search history.

(56) References Cited

U.S. PATENT DOCUMENTS

| | | | |
|---|---|---|---|
| 5,801,922 A * | 9/1998 | Shen et al. | 361/679.32 |
| 6,315,252 B1 | 11/2001 | Schultz | |
| 7,084,932 B1 * | 8/2006 | Mathias et al. | 348/837 |
| 7,606,473 B2 * | 10/2009 | Ikunami | 386/358 |
| 2002/0149708 A1 * | 10/2002 | Nagata et al. | 348/837 |
| 2004/0240174 A1 * | 12/2004 | Ooka et al. | 361/687 |

FOREIGN PATENT DOCUMENTS

| | | |
|---|---|---|
| DE | 203 02 684 U1 | 4/2003 |
| EP | 1 219 498 A1 | 7/2002 |
| JP | 4-54048 U | 5/1992 |
| JP | 4-111039 U | 9/1992 |
| JP | 5-38981 A | 2/1993 |
| WO | WO 00/38951 * | 7/2000 |
| WO | WO 02/09976 A1 | 2/2002 |

OTHER PUBLICATIONS

Supplementary European Search Report for EP 05 75 3373, Jul. 17, 2009. International Search Report for PCT/JP2005/011463, dated Jul. 26, 2005.

* cited by examiner

*Primary Examiner* — Thai Tran
*Assistant Examiner* — Girumsew Wendmagegn
(74) *Attorney, Agent, or Firm* — RatnerPrestia

(57) ABSTRACT

A medium reproduction/display apparatus enables stable insertion of a medium to be reproduced in a medium insertion/removal manipulation and whose thickness dimension can be reduced while its depth and width dimensions are kept small. In a medium reproduction unit, a control board is disposed on the ceiling side and has a hole in a portion that would otherwise touch a medium reproduction device that is directed obliquely downward. The control board s thus located at the same height as part of the medium reproduction device. A display device is directed obliquely downward in an accommodated state. A display unit is configured in such a manner that a control board is disposed on the side of a rotary mechanism. With this configuration, the insertion and removal of an optical disc are facilitated, the thickness dimension is reduced while the depth dimension and the width dimension are kept small, and the shape of the entire apparatus is made flat to improve the design performance.

7 Claims, 8 Drawing Sheets

DISPLAY APPARATUS

This application is a U.S. National Phase Application of PCT International Application PCT/JP2005/011463.

TECHNICAL FIELD

The present invention relates to a medium reproduction/display apparatus in which a medium reproduction unit and a display unit for reproducing and displaying audio and video information recorded on a medium are integrated with each other and which is mounted on the ceiling or floor of a vehicle, an airplane, a ship, or the like.

BACKGROUND ART

Conventional display apparatus have a structure that as shown in FIG. 8 a medium reproduction unit 81 and a display unit 62 (accommodated) are laid horizontally and placed on each other in the vertical direction, a structure that as shown in FIG. 9 they are arranged so as to assume an approximately straight line extending in the front-rear direction of a vehicle or the like, or a structure that as shown in FIG. 10 they are arranged in the right-left direction of a vehicle or the like.

Another configuration is known in which a medium insertion unit can be elevated and lowered (lowered obliquely downward) so as to facilitate a medium insertion/removal manipulation (e.g., Patent document 1).
Patent document 1: JP-T-2002-009976

DISCLOSURE OF THE INVENTION

Problems to be Solved by the Invention

Among conventional medium reproduction/display apparatus, ones whose medium insertion unit cannot be elevated and lowered have a problem that a seated user has difficulty inserting or removing a medium because the direction in which to inset or remove an optical disc into or from the medium reproduction device 81 is parallel with the ceiling. Even where the medium insertion unit can be elevated and lowered, the medium insertion unit may be rendered unstable when vibration is being received externally, in which case the medium reading accuracy may be lowered to cause such a phenomenon as a jump of sound data or a medium may be damaged when it is inserted or removed. Another problem is that the apparatus is thick because the medium insertion unit which can be elevated and lowered should surround the entire medium reproduction device.

The structure that the medium reproduction device 81 and the display device 82 are placed on each other in the vertical direction has a large thickness dimension and the structure that they are arranged in the front-rear or right-left direction has a large depth or width dimension, which results in a problem that the apparatus cannot be mounted for certain ceiling structures or positions of a sunroof or the like of a vehicle.

The present invention has been made to solve the problems in the art, and an object of the invention is therefore to provide a medium reproduction/display apparatus which enables stable insertion of a medium to be reproduced in a medium insertion/removal manipulation and whose thickness dimension can be reduced while its depth and width dimensions are kept small.

Means for Solving the Problems

The invention provides a ceiling-mounted medium reproduction/display apparatus which has a medium reproduction device for reproducing information recorded on a medium and a display device for displaying video information reproduced by the medium reproduction device and which is mounted on a ceiling surface of a room, wherein the medium reproduction device is fixed so as to allow the medium to be inserted obliquely with respect to the ceiling surface.

With this configuration, although the configuration is simple, the medium insertion/removal portion of the medium reproduction/display apparatus is not hidden in the ceiling and a medium can be inserted obliquely in a stable manner. A medium insertion or removal operation can thus be performed easily.

In the medium reproduction/display apparatus according to the invention, the display device can be accommodated so as to be approximately parallel with the medium reproduction device.

This configuration not only facilitates insertion and removal of a medium but also enables effective use of the space in the ceiling, which makes it possible to reduce the thickness.

In the medium reproduction/display apparatus according to the invention, a control board for controlling the medium reproduction device is disposed on the ceiling side of the medium reproduction device and has a through-hole through which part of the medium reproduction device penetrates.

This configuration makes it possible to not only reduce the thickness dimension while keeping the depth dimension and the width dimension small but also dissipate upward the heat generated in the apparatus, which in turn makes it possible to suppress temperature increase in the apparatus.

In the medium reproduction/display apparatus according to the invention, divisional portions of a control board for controlling the medium reproduction device are disposed on both sides of the medium reproduction device.

This configuration makes it possible to not only reduce the thickness dimension while keeping the depth dimension and the width dimension small but also dissipate upward the heat generated in the apparatus, which in turn makes it possible to suppress temperature increase in the apparatus. Furthermore, since the control board for controlling the medium reproduction device can be disposed in a divided manner, the degree of freedom of the layout of control boards is increased.

The display apparatus according to the invention further comprises a rotary mechanism for supporting the display device rotatably, and a display device control board for controlling the display device is disposed on the rotary mechanism side of the display device.

This configuration makes it possible to make the shape of the entire apparatus flat while keeping the thickness dimension small, which in turn makes it possible to improve the design performance.

The invention also provides a floor-mounted medium reproduction/display apparatus which has a medium reproduction device for reproducing information recorded on a medium and a display device for displaying video information reproduced by the medium reproduction device and which is mounted on a floor surface of a room, wherein the medium reproduction device is fixed so as to allow the medium to be inserted obliquely with respect to the floor surface.

With this configuration, although the configuration is simple and does not employ any special structure, the medium insertion/removal portion of the medium reproduction/display apparatus is not hidden below the floor surface and a medium can be inserted obliquely in a stable manner. A medium insertion or removal operation can thus be performed easily.

In the medium reproduction/display apparatus according to the invention, the display device can be accommodated so as to be approximately parallel with the medium reproduction device.

This configuration not only facilitates insertion and removal of a medium but also enables effective use of the space below the floor surface, which makes it possible to reduce the thickness.

In the medium reproduction/display apparatus according to the invention, a control board for controlling the medium reproduction device is disposed on the floor side of the medium reproduction device and has a through-hole through which part of the medium reproduction device penetrates.

This configuration makes it possible to not only reduce the thickness dimension while keeping the depth dimension and the width dimension small but also dissipate downward the heat generated in the apparatus, which in turn makes it possible to suppress temperature increase in the apparatus.

In the medium reproduction/display apparatus according to the invention, divisional portions of a control board for controlling the medium reproduction device are disposed on both sides of the medium reproduction device.

This configuration makes it possible to not only reduce the thickness dimension while keeping the depth dimension and the width dimension small but also dissipate downward the heat generated in the apparatus, which in turn makes it possible to suppress temperature increase in the apparatus. Furthermore, since the control board for controlling the medium reproduction device can be disposed in a divided manner, the degree of freedom of the layout of control boards is increased.

The medium reproduction/display apparatus according to the invention further comprises a rotary mechanism for supporting the display device rotatably, and a display device control board for controlling the display device is disposed on the rotary mechanism side of the display device.

This configuration makes it possible to make the shape of the entire apparatus flat while keeping the thickness dimension small, which in turn makes it possible to improve the design performance.

Advantages of the Invention

The invention can provide a display device having the following advantages. Since the medium reproduction device is fixed so as to allow a medium to be inserted obliquely with respect to the ceiling surface, a medium insertion/removal manipulation can be performed in a stable manner and a medium can be inserted and removed easily. Since the ceiling-side space can be utilized effectively, the thickness dimension of the apparatus can be reduced.

The invention can also provide a display device having the following advantages. Since the medium reproduction device is fixed so as to allow a medium to be inserted obliquely with respect to the floor surface, a medium insertion/removal manipulation can be performed in a stable manner and a medium can be inserted and removed easily. Since the floor-surface-side space can be utilized effectively, the thickness dimension of the apparatus can be reduced.

DESCRIPTION OF SYMBOLS

Figure 1:
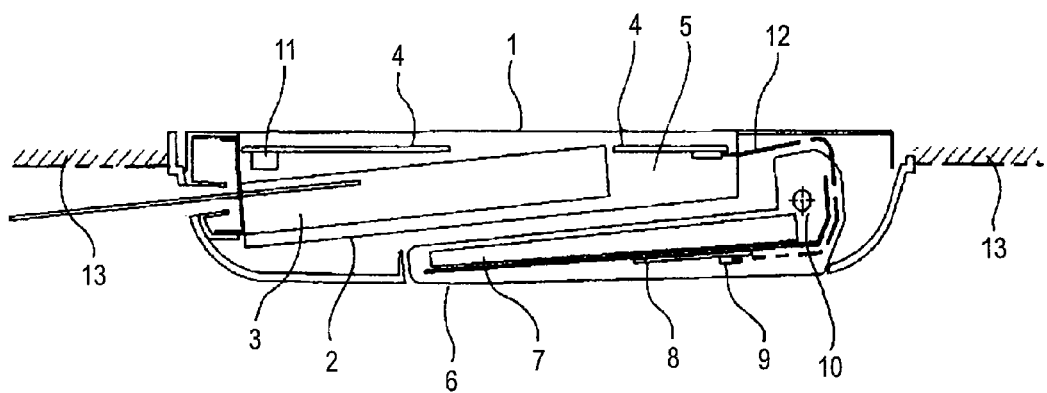
FIG. 1 is a side sectional view of a medium reproduction/display apparatus according to a first embodiment of the invention.

1: Medium reproduction/display apparatus
2: Case of medium reproduction unit
3: Medium reproduction device
4: Control board (main board) for medium reproduction device
5: Medium reproduction unit
6: Case of display unit
7: Display device
8: Display device control board
9: Display unit
10: Rotary mechanism
11: Connector
12: Connection cable
13: Ceiling
20: Optical disc (medium)
21: Optical disc insertion mouth (medium insertion mouth)
30: Medium reproduction control section
31: Display control section
32: Video output section
33: Audio output section
41: Medium reproduction/display apparatus of second embodiment
42: Case of medium reproduction unit of second embodiment
43: Medium reproduction device of second embodiment
44: Control board (main board) for medium reproduction device of second embodiment
45: Medium reproduction unit of second embodiment
46: Case of display unit of second embodiment
47: Display device of second embodiment
48: Display device control board of second embodiment
49: Display unit of second embodiment
50: Rotary mechanism of second embodiment
51: Connector of second embodiment
52 Connection cable of second embodiment
53: Floor
61: Optical disc insertion mouth (medium insertion mouth) of second embodiment
81: Conventional medium reproduction device
82: Conventional display device

BEST MODE FOR CARRYING OUT THE INVENTION

Display apparatus according to embodiments of the present invention will be hereinafter described with reference to the drawings.

First Embodiment

FIG. 1 is a sectional view of a display apparatus 1 according to a first embodiment of the invention. The medium reproduction/display apparatus 1 is mounted in such a manner as to be somewhat buried in a ceiling 13 whose surface is a mounting surface. Mainly as a countermeasure against electromagnetic interference and a dust-proof measure, a medium reproduction unit 5 is covered with a medium reproduction unit case 2.

A display unit 9 is attached to the medium reproduction/display apparatus 1 via a support shaft of a rotary mechanism 10 for opening and closing the display unit 9. A connection cable 12 for connecting the medium reproduction unit 5 and the display unit 9 is provided, through which electrical signals such as a video signal, control signals, etc. are exchanged between the medium reproduction unit 5 and the display unit 9.

This embodiment will be described for a case that the medium reproduction unit 5 is a DVD reproduction unit for reproducing a DVD which is inserted singly. However, the medium reproduction unit 5 is not limited to a DVD reproduction unit and may be a CD reproduction unit, an MD reproduction unit, a cassette tape reproduction unit, or the like, or a medium reproduction unit for an SD card, a memory stick, or the like, a detachable HDD, or a multi-disc medium reproduction unit which reproduces a medium selected from plural media that are inserted in the unit.

In the medium reproduction unit 5, a medium reproduction device 3 which incorporates mechatronic components such as an optical pickup and a turntable (not shown) for reproducing an inserted optical disc is fixed in such a manner that a medium insertion mouth 21 is directed obliquely downward with respect to the ceiling 13 whose surface is the mounting surface of the medium reproduction/display apparatus 1 and a medium to be reproduced can thereby be inserted obliquely upward.

Since as described above an operator can insert, obliquely upward, a medium he or she wants to reproduce, he or she can perform an inserting manipulation easily. Furthermore, since the medium reproduction unit is fixed, a medium inserting manipulation can be performed easily even if external vibration is received.

A medium reproduction device control section 30 having electronic components etc. for electrically controlling the medium reproduction device 3 is mounted on a control board (hereinafter referred to as "main board") 4 which has electronic components etc. for electronic control on the entire medium reproduction/display apparatus 1 and controls the medium reproduction device and the display unit 9 which are installed parallel with the ceiling 13.

Since the medium reproduction device 3 is mounted below the main board so as to extend obliquely downward with the medium insertion mouth 21 located below, the edge of the rear end portion of the medium reproduction device 3 would touch the main board unless a proper measure were taken. Therefore, a hole is formed only in the portion concerned of the main board 4.

That is, part of the medium reproduction device 3 is located at the same level as the main board 4 in the height direction and is sandwiched between portions of the main board 4 in the horizontal direction. This arrangement makes it possible to place the medium reproduction device 3 at a higher position and to thereby make the apparatus thinner. Furthermore, heat radiation is enabled through the space between the medium reproduction device 3 and the main board 4.

The main board 4 is also provided with a connector 11 for supplying power to the medium reproduction/display apparatus 1 externally and outputting a video signal, an audio signal, etc. to an external apparatus via a video output section and an audio output section which control a video signal and an audio signal that are output from the medium reproduction device 3.

The display unit 9 incorporates a display device 7 such as a liquid crystal display, an organic EL display, an inorganic EL display, an FED (field emission display), an SED (surface-conduction electron-emitter display), a VFD (vacuum fluorescent display), a plasma display, or a CRT display, a display board 8 having a display device control section for electronic control on the display device 7, a case 6 which covers the above components, and other components.

In a state that the display unit 9 is accommodated, the display device 7 is directed obliquely downward. The display board 8 is disposed on the side of the rotary mechanism 10 for putting the display unit into an accommodated state.

The operation of the above-configured display apparatus 1 will be described below.

Figure 2:
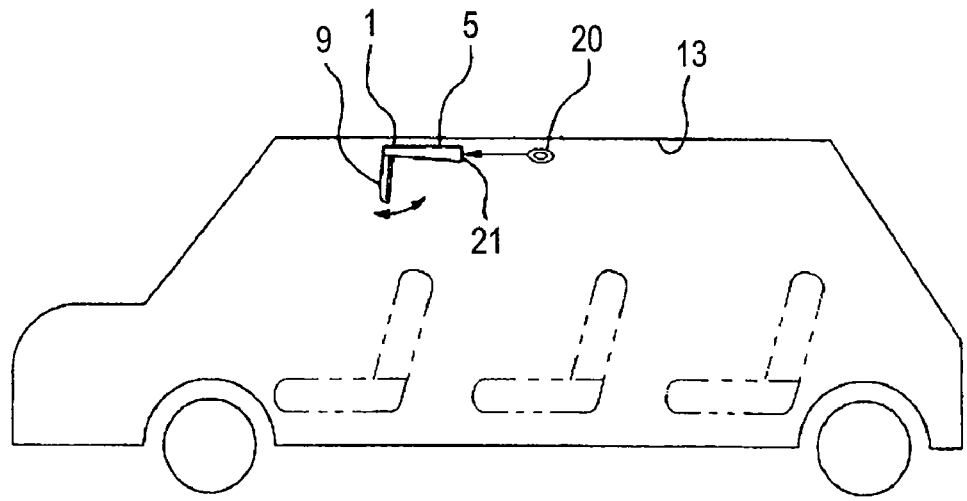
FIG. 2 is a side view of the medium reproduction/display apparatus according to the first embodiment of the invention which is mounted on a vehicle.
Figure 3:
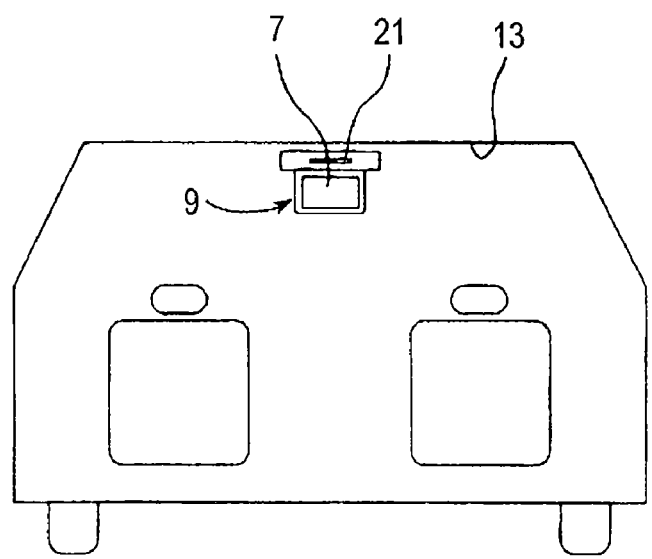
FIG. 3 is a front view of the medium reproduction/display apparatus according to the first embodiment of the invention which is mounted on the vehicle.

FIG. 2 is a side view of the display apparatus according to the first embodiment of the invention which is mounted on a vehicle. FIG. 3 is a front view of the display apparatus according to the first embodiment of the invention which is mounted on the vehicle.

As shown in FIGS. 2 and 3, the display apparatus 1 is mounted on the ceiling 13. When a passenger starts inserting an optical disc 20 through the insertion mouth 21 of the medium reproduction unit 5, the insertion of the optical disc 20 is detected in the vicinity of the insertion mouth of the medium reproduction unit 5 and a roller (not shown) starts to rotate. And an operation of pulling the medium 20 into the medium reproduction unit 5 while the optical disc 20 is held between the roller and the case or the like of the medium reproduction unit 5. The optical disc 20 is thereby placed at a reproduction position of the medium reproduction unit 5.

When a reproduction manipulation is performed thereafter, a reproduced image can be seen on the display device 7. A sound can be heard through an audio reproduction device(s) (not shown) provided in the vehicle such as speakers, a wireless headphone, or a wired headphone.

To eject the optical disc 20 from the medium reproduction unit 5 when its reproduction has finished or it should be replaced by another one, a transition is made to an ejection operation by, for example, depressing an ejection button (not shown). As a result, an operation opposite to the operation that was performed at the time of disc insertion is performed.

That is, the above-mentioned roller (not shown) is rotated in the reverse direction, whereby the disc 20 is ejected from the disc reproduction position to the disc insertion mouth 21. Then, the rotation of the roller is stopped when the optical disc 20 is located at such a position as not to fall down. The operator is to pull out the thus-ejected optical disc 20.

When a passenger does not use the apparatus or a driver looks behind the vehicle, the display unit 9 can be closed and accommodated. In this state (i.e., the display device 9 is accommodated), the display device 7 is oriented obliquely so as to be approximately parallel with the medium reproduction device, which makes it possible to reduce the thickness of the medium reproduction/display device 1 further and to thereby secure a wide rear field of vision of the driver.

Since the case 6 of the display unit is formed so that the bottom surface of the medium reproduction/display device 1 is approximately parallel with the ceiling in a state that the display unit 9 is accommodated, no projections or recesses are formed on the bottom surface of the medium reproduction/display device 1 in a state that the display unit 9 is accommodated, which improves the design performance. Furthermore, since a space is formed between the display device 7 and the case 6 of the display unit on the side of the rotary mechanism 10, the display device control board 8 can be disposed by utilizing this space.

Figure 4:
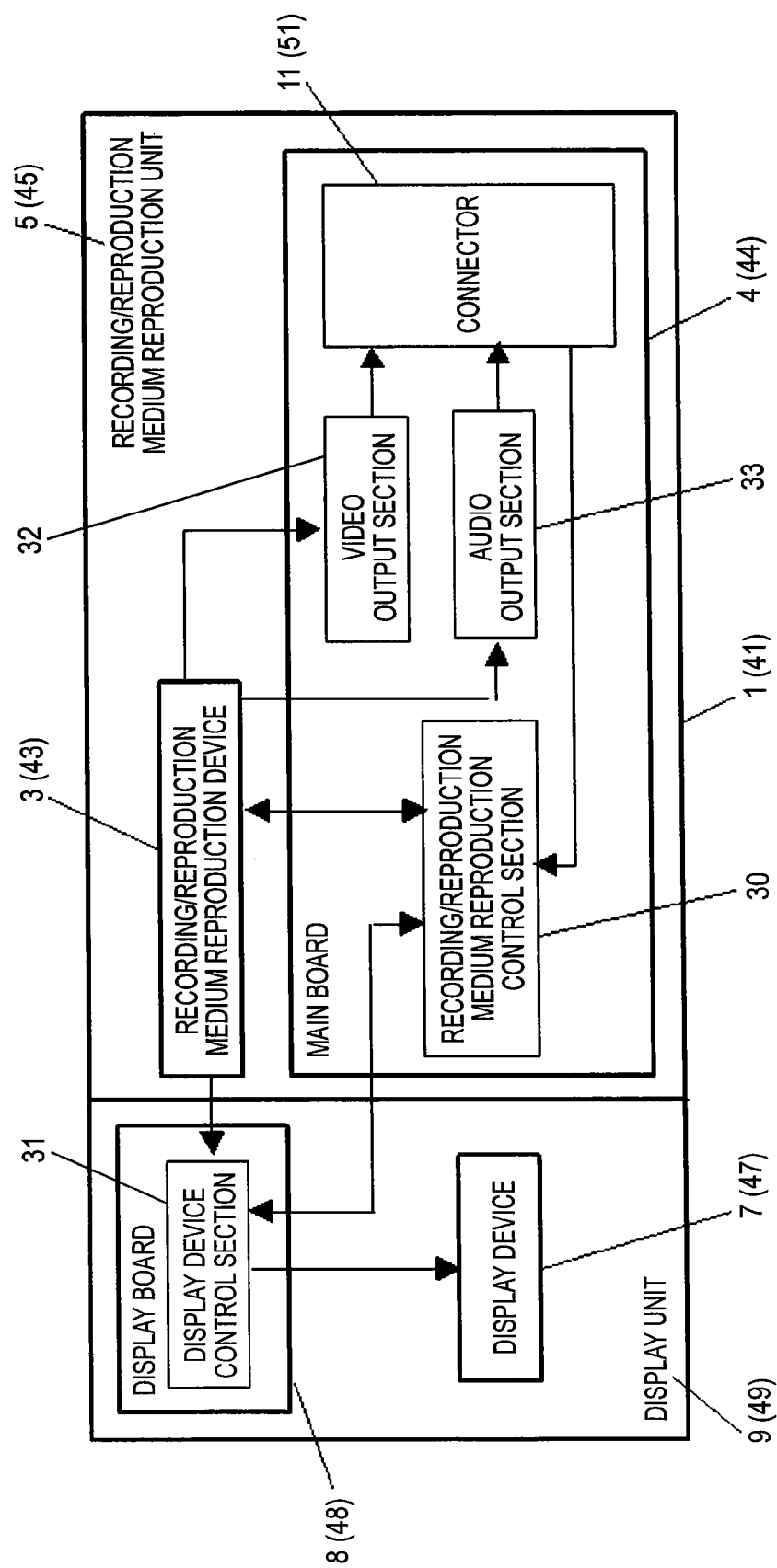
FIG. 4 is a block diagram of the medium reproduction/display apparatus according to the first and second embodiments of the invention.

FIG. 4 is a system block diagram of the display apparatus 1 according to the first embodiment of the invention.

As described above, the medium reproduction/display device 1 has the medium reproduction unit 5 and the display unit 9. The medium reproduction unit 5 is composed of the medium reproduction control section 30 for electronic control on the medium reproduction device 3 and communication with the display board, a control section (not shown) for controlling an opening/closing control on the display unit 9, the connector 11 for electronic connections to the outside, and other components.

When an optical disc 20 (see FIG. 2) is inserted into the medium reproduction device 3 and a reproduction manipulation is performed, a video signal that is output form the medium reproduction device 3 is sent to a display control section 31, where it is converted into a signal that can be displayed on the display device 7. An image is thereby displayed on the display device 7.

On the other hand, an audio signal that is output from the medium reproduction device 3 is converted into a proper audio level by the audio output section 33 and a resulting signal is output from the connector 11. A headphone jack can be connected to an audio output portion of the connector 11. A user can listen to a reproduced sound using a headphone.

Alternatively, an audio signal may be transmitted using infrared light. A user can listen to a sound that is output from the medium reproduction device 3 using a headphone or speaker units having a receiving means for receiving the audio signal and converting means for converting the received audio signal into a sound.

As described above, according to the medium reproduction/display apparatus 1 according to the first embodiment of the invention, since the medium reproduction device 3 and the display unit 9 (accommodated) are mounted on the ceiling so as to be directed obliquely downward, the medium insertion/removal portion of the medium reproduction unit 5 is not hidden in the ceiling 13 and an optical disc 20 can be inserted and removed easily. Since the space in the ceiling 13 can be utilized effectively, the thickness dimension of the apparatus can be reduced.

The main board 4 is disposed on the ceiling 13 side and the hole is formed in that portion of the main board 4 which would otherwise touch the medium reproduction device 3, whereby the main board 4 is located at the same height as part of the medium reproduction device 3. With this arrangement, the thickness dimension can be reduced while the depth dimension and the width dimension are kept small. Furthermore, since heat generated in the apparatus can be dissipated upward through the hole, the temperature increase in the apparatus can be suppressed.

Since the apparatus is configured in such a manner that the display board 8 is disposed on the side of the rotary mechanism 10 of the display unit 9, the shape of the entire apparatus can be made flat while the thickness dimension is kept small, which contributes to improvement in design performance. This will be described below in more detail. The display device 7 (accommodated) and the display board 8 are mounted so as to be directed obliquely downward, and the display board 8 is smaller in the depth dimension than the display device 7 and is mounted with circuit components.

Therefore, the space can be utilized effectively by making the shape of the display unit 9 (accommodated) triangular when viewed from the side and disposing the display board on the side of the rotary mechanism 10. Since the bottom surface of the medium reproduction/display apparatus 1 can be made parallel with the ceiling surface 13 in a state that the display unit is accommodated, superior design performance can be attained together with thickness reduction.

Second Embodiment

Figure 5:
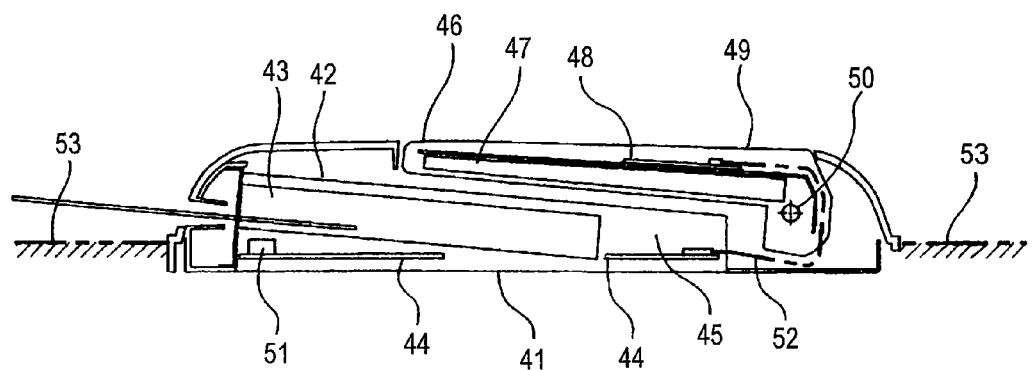
FIG. 5 is a sectional view of a medium reproduction/display apparatus according to a second embodiment of the invention.
Figure 6:
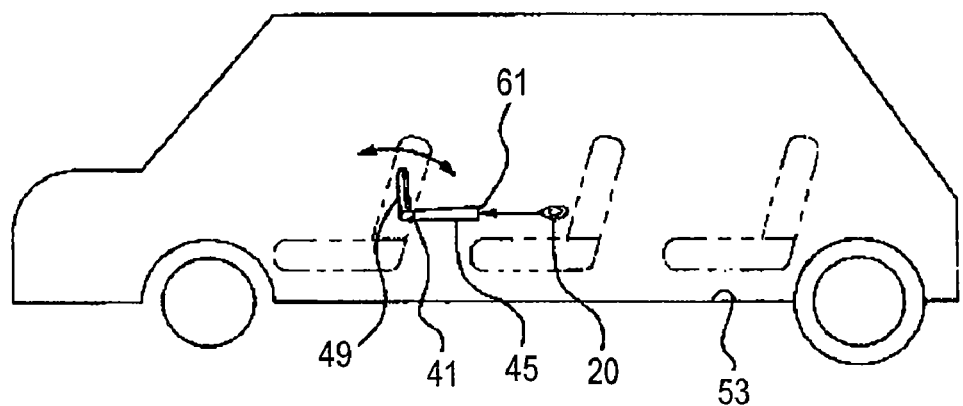
FIG. 6 is a side view of the medium reproduction/display apparatus according to the second embodiment of the invention which is mounted on a vehicle.
Figure 7:
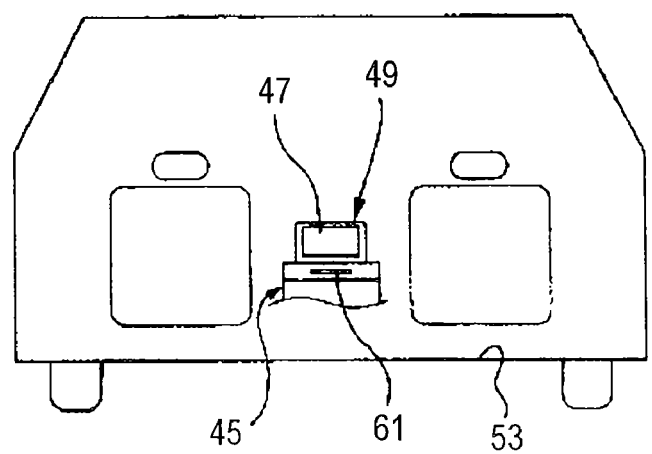
FIG. 7 is a front view of the medium reproduction/display apparatus according to the second embodiment of the invention which is mounted on the vehicle.
Figure 8:
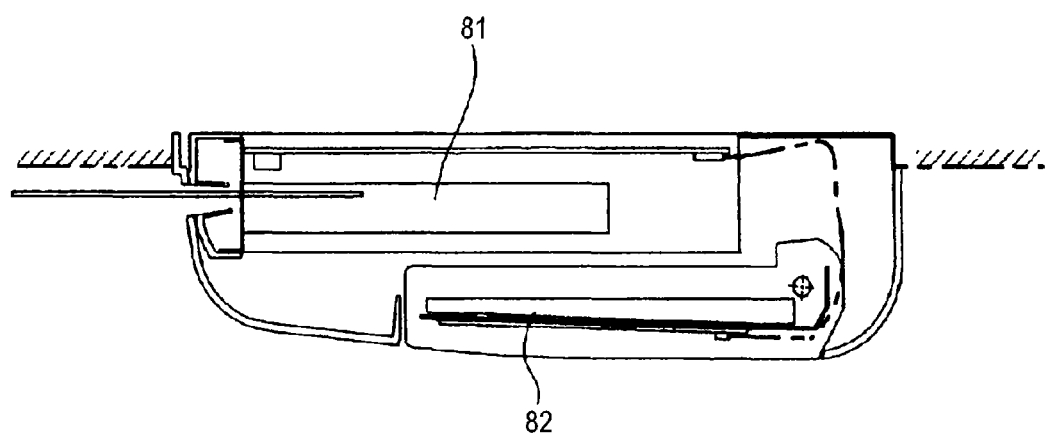
FIG. 8 shows a conventional display apparatus in which a medium reproduction device and a display device (accommodated) are laid horizontally and placed on each other in the vertical direction.
Figure 9:
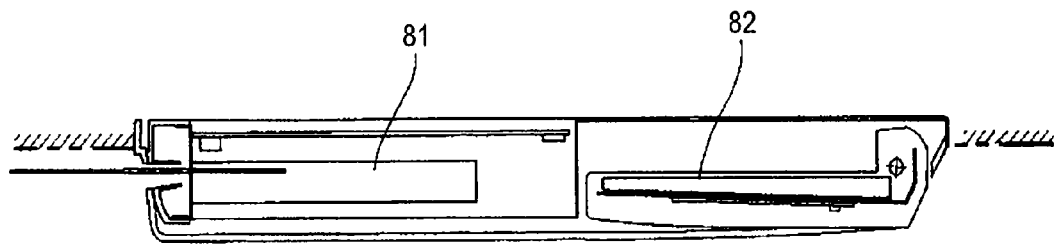
FIG. 9 shows a conventional display apparatus in which a medium reproduction device and a display device (accommodated) are arranged in the front-rear direction.
Figure 10:
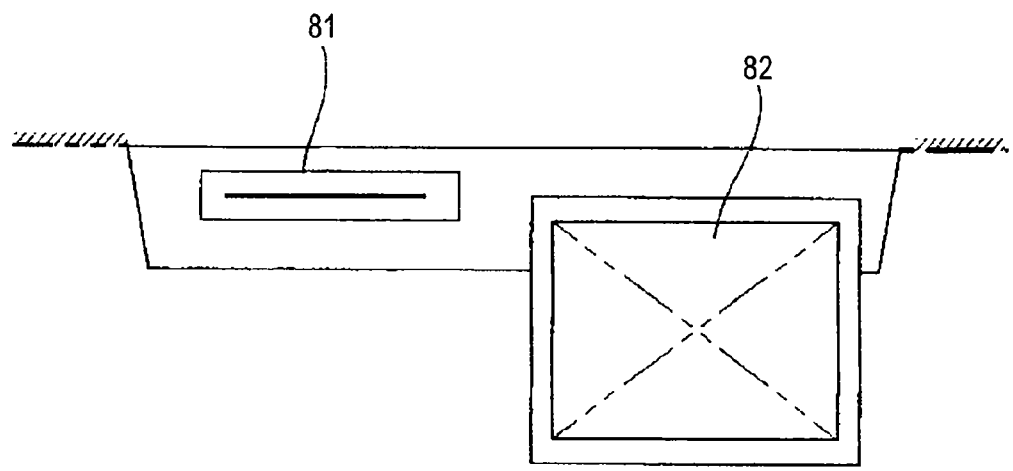
FIG. 10 shows a conventional display apparatus in which a medium reproduction device and a display device (accommodated) are arranged in the right-left direction.

FIG. 5 is a sectional view of a medium reproduction/display apparatus 41 according to a second embodiment of the invention. The medium reproduction/display apparatus 41 is mounted in such a manner as to be somewhat buried through a floor surface 53 whose surface is a mounting surface, and a medium reproduction unit 45 is covered with a medium reproduction unit case 42. This is mainly a countermeasure against electromagnetic interference and a dust-proof measure.

A display unit 49 is attached to the medium reproduction/display apparatus 41 via a support shaft of a rotary mechanism 50 for opening and closing the display unit 49. A connection cable 52 for connecting the medium reproduction unit 45 and the display unit 49 is provided, through which electrical signals such as a video signal, control signals, etc. are exchanged between the medium reproduction unit 45 and the display unit 49.

This embodiment will be described for a case that the medium reproduction unit 45 is a DVD (digital versatile disc) reproduction unit for reproducing a DVD which is inserted singly. However, another medium reproduction unit may be used as described in the first embodiment of the invention.

A system block diagram of the medium reproduction/display apparatus 41 according to the second embodiment of the invention is the same as the system block diagram of the medium reproduction/display apparatus 1 according to the first embodiment, and hence will not be described in detail.

In the medium reproduction unit 45, a medium reproduction device 43 which incorporates mechatronic components such as an optical pickup and a turntable (not shown) for reproducing an inserted optical disc is fixed in such a manner that a medium insertion mouth 61 is directed obliquely upward with respect to the floor surface 53 as the mounting surface of the medium reproduction/display apparatus 41 and a medium to be reproduced can thereby be inserted obliquely downward. Since as described above an operator can insert, obliquely downward, a medium he or she wants to reproduce, he or she can perform an inserting manipulation easily. Furthermore, since the medium reproduction unit is fixed, a medium inserting manipulation can be performed easily even if external vibration is received.

A medium reproduction device control section 30 having electronic components etc. for electrically controlling the medium reproduction device 43 is mounted on a control board (hereinafter referred to as "main board") 44 which has electronic components etc. for electronic control on the entire medium reproduction/display apparatus 41 and controls the medium reproduction device and the display unit 49 which are installed parallel with the floor surface 53.

Since the medium reproduction device 43 is mounted above the main board 44 so as to extend obliquely upward with the medium insertion mouth 61 located below, the edge of the rear end portion of the medium reproduction device 43 would touch the main board 44 unless a proper measure were taken. Therefore, a hole is formed only in the portion concerned of the main board 44. That is, part of the medium reproduction device 43 is located at the same level as the main board 44 in the height direction. This arrangement makes it possible to place the medium reproduction/display apparatus 41 at a lower position and to thereby make the medium reproduction apparatus thinner.

The main board 44 is also provided with a connector 51 for supplying power to the medium reproduction/display apparatus 41 externally and outputting a video signal, an audio signal, etc. to an external apparatus via a video output section and an audio output section which control a video signal and an audio signal that are output from the medium reproduction device 43.

The display unit 49 incorporates a display device 47 such as a liquid crystal display, an organic EL display, an inorganic EL display, an FED (field emission display), an SED (surface-conduction electron-emitter display), a VFD (vacuum fluorescent display), a plasma display, or a CRT display, a display board 48 having a display control section for electronic control on the display device 7, a case 46 which covers the above components, and other components.

In a state that the display unit 49 is accommodated, the display device 47 is directed obliquely upward. The display board 48 is disposed on the side of the rotary mechanism 50 for putting the display unit into an accommodated state.

The operation of the display apparatus 41 according to the second embodiment of the invention is the same as that of the medium reproduction/display apparatus 1 according to the first embodiment except that the display and medium insertion directions are opposite, and hence will not be described in detail.

As described above, according to the medium reproduction/display apparatus 41 according to the second embodiment of the invention, since the medium reproduction device 43 and the display unit 49 (accommodated) are mounted on the floor so as to be directed obliquely upward, the medium insertion/removal portion of the medium reproduction unit 45 is not hidden below the floor surface 53 and an optical disc 20 can be inserted and removed easily. Since the space below the floor surface 53 can be utilized effectively, the thickness dimension of the apparatus can be reduced.

The main board 44 is disposed on the floor surface 53 side and the hole is formed in that portion of the main board 44 which would otherwise touch the medium reproduction device 43, whereby the main board 44 is located at the same height as part of the medium reproduction device 43. With this arrangement, the thickness dimension can be reduced while the depth dimension and the width dimension are kept small. Furthermore, since heat generated in the apparatus can be dissipated downward through the hole, the temperature increase in the apparatus can be suppressed.

Since the apparatus is configured in such a manner that the display board 48 is disposed on the side of the rotary mechanism 50 of the display unit 49, the shape of the entire apparatus can be made flat while the thickness dimension is kept small, which contributes to improvement in design performance. This will be described below in more detail. The display device 47 (accommodated) and the display board 48 are mounted so as to be directed obliquely upward, and the display board 48 is smaller in the depth dimension than the display device 47 and is mounted with circuit components.

Therefore, the space can be utilized effectively by making the shape of the display unit 9 (accommodated) triangular when viewed from the side and disposing the display board on the side of the rotary mechanism 10. Since the top surface of the medium reproduction/display apparatus 41 can be made parallel with the floor surface 53 in a state that the display unit is accommodated, superior design performance can be attained together with thickness reduction.

This application is based on Japanese Patent Application No. 2004-199113 filed on Jul. 6, 2004, the disclosure of which is incorporated by reference herein.

INDUSTRIAL APPLICABILITY

As described above, the medium reproduction/display apparatus according to the invention have the following advantages. Since the medium reproduction device and the display unit (accommodated) are mounted so as to be directed obliquely with respect to the mounting surface, the medium insertion/removal portion of the medium reproduction device is not hidden above or below the mounting surface and a medium can be inserted and removed in the oblique direction and hence can be done so easily. Since the space in the ceiling or the floor can be utilized effectively, the thickness dimension of the apparatus can be reduced. As such, the medium reproduction/display apparatus according to the invention is useful when used as an apparatus in which a medium reproduction unit and a display unit are integrated with each other and which is mounted on the ceiling or floor of a vehicle, an airplane, a ship, or the like.

The invention claimed is:

1. A medium reproduction/display apparatus adapted to be mounted on a ceiling surface of a room, comprising:
    a medium reproduction device that reproduces information recorded on a medium;
    a display device that displays video information reproduced by the medium reproduction device; and
    a circuit board having electronic components mounted thereon for controlling the medium reproduction device,
    wherein the medium reproduction device is fixed so as to allow the medium to be inserted obliquely with respect to the ceiling surface, and
    the circuit board is disposed on a ceiling side of the medium reproduction device and has a through-hole through which a part of the medium reproduction device penetrates.

2. The medium reproduction/display apparatus according to claim 1, wherein the display device can be accommodated so as to be approximately parallel with the medium reproduction device.

3. A medium reproduction/display apparatus adapted to be mounted on a ceiling surface of a room, comprising:
    a medium reproduction device that reproduces information recorded on a medium;
    a display device that displays video information reproduced by the medium reproduction device; and
    divided circuit boards having electronic components mounted thereon for controlling the medium reproduction device,
    wherein the medium reproduction device is fixed so as to allow the medium to be inserted obliquely with respect to the ceiling surface through a front of said medium reproduction device, and
    one of the divided circuit boards is above the medium reproduction device and another of the divided circuit boards is behind the medium reproduction device without being above the medium reproduction device.

4. The medium reproduction/display apparatus according to claim 1, further comprising a rotary mechanism that supports the display device rotatably; and
- a display device circuit board having electronic components mounted thereon for controlling the display device,
- wherein the display device circuit board is disposed on a rotary mechanism side of the display device.

5. A medium reproduction/display apparatus adapted to be mounted on a floor surface of a room, comprising:
- a medium reproduction device that reproduces information recorded on a medium;
- a display device that displays video information reproduced by the medium reproduction device; and
- a circuit board having electronic components mounted thereon for controlling the medium reproduction device,
- wherein the medium reproduction device is fixed so as to allow the medium to be inserted obliquely with respect to the floor surface, and
- one of the divided circuit boards is below the medium reproduction device and another of the divided circuit boards is behind the medium reproduction device without being below the medium reproduction device.

6. The medium reproduction/display apparatus according to claim 5, wherein the display device can be accommodated so as to be approximately parallel with the medium reproduction device.

7. The medium reproduction/display apparatus according to claim 5, further comprising a rotary mechanism that supports the display device rotatably; and
- a display device circuit board having electronic components mounted thereon for controlling the display device,
- wherein the display device circuit board is disposed on a rotary mechanism side of the display device.

* * * * *